Aug. 12, 1941.  E. J. CULLIGAN  2,252,065

METHOD AND APPARATUS FOR TREATING WATER SOFTENERS

Filed Sept. 11, 1939  2 Sheets-Sheet 1

Inventor
Emmett Joseph Culligan

By (signature)
Attorney

Aug. 12, 1941.  E. J. CULLIGAN  2,252,065

METHOD AND APPARATUS FOR TREATING WATER SOFTENERS

Filed Sept. 11, 1939  2 Sheets-Sheet 2

Inventor
Emmett Joseph Culligan

Attorney

Patented Aug. 12, 1941

2,252,065

UNITED STATES PATENT OFFICE 2,252,065

METHOD AND APPARATUS FOR TREATING WATER SOFTENERS

Emmett Joseph Culligan, La Grange, Ill., assignor to Culligan Zeolite Co., Northbrook, Ill., a copartnership Application September 11, 1939, Serial No. 294,281

12 Claims. (Cl. 210—24)

My invention relates to an improvement in the method of regenerating base exchange water softening units wherein it is desired to provide a method and apparatus capable of rejuvenating a series of water softening units simultaneously in such a manner that each unit may be regenerated more quickly and more effectively than would be possible in the regeneration of the several units singly.

Some years ago the method of softening water with zeolite was discovered. Since that time, the method has been used extensively, both in water plants of considerable size and also in individual home units. The first materials used in purifying water and softening the same were natural soils of zeolite composition, known as "Green-sands." Later, however, chemical research developed a synthetic zeolite totally free of inert impurities which was greatly more effective in the softening of water.

Zeolites are usually compounds of sodium, silica, and iron or aluminum oxides. A typical formula might be represented chemically as: $Na_2O.Al_2O_3.3SiO_2$. Substituting the letter Z for the zeolite to represent most of the formula, I may state that a fresh sodium zeolite would be $Na_2Z$.

Hardness in water is usually caused by calcium and magnesium salts, principally the bicarbonate, although sulphate and chlorides are often present. Bicarbonates cause what is called "temporary hardness," while chlorides and sulphates cause "permanent hardness." When a solution containing calcium or magnesium salts is passed through a bed of zeolite, the calcium or magnesium ions are taken up by the zeolite and replaced in solution by sodium ions. Using the simplified zeolite formula, the chemical equation would be as follows:

$$Ca(HCO_3)_2 + Na_2Z = CaZ + 2NaHCO_3$$

With magnesium or other salts of calcium, the results are similar; the softened water containing the corresponding sodium salt. After a time, however, the greater portion of the available sodium ions in the zeolite will have been replaced with calcium or magnesium and the effluent water will contain some hardness. The zeolite is now said to be in the "calcium condition," or in other words, is exhausted and must be regenerated.

By passing brine of ordinary salt or sodium chloride through the zeolite, the calcium and magnesium therein is replaced by the sodium in the brine and this calcium and magnesium passes off in the waste brine. The excess salt is washed out with water and the softener is ready for another capacity cycle of softening. The regeneration reaction may be represented as:

$$CaZ + 2NaCl = CaCl_2 + Na_2Z$$

It is well known that in regenerating a body of zeolite, a preponderance of sodium chloride will act more quickly and thoroughly upon the exhausted zeolite than lesser amounts, and a more complete regeneration of the softeners is accomplished. This however, requires the waste of a considerable amount of salt or brine.

In the past water softening units have been provided in individual homes and it was necessary for the home owner to regenerate the same at intervals. A new method has been developed in my invention, wherein a portable zeolite cylinder is utilized which is owned by a service company and which is cared for by service men employed by the company. The regeneration is accomplished by exchanging from time to time, the unit which has been in service and which is approaching an exhausted condition, for a freshly rejuvenated unit. The spent unit is then taken to a central station and regenerated.

I have found that by placing several zeolite cylinders in series and forcing a flow of brine through this series of cylinders, a number of cylinders can be rejuvenated more quickly and more effectively than could single cylinders be rejuvenated without wasting a considerable amount of salt. This is true for the reason that by arranging the cylinders in series, the excess salt that would ordinarily be wasted by each softener in individual regeneration is now given to the next softener so that the only wasted salt is from the last softener in series. In other words in the past it has been necessary to force a solution of approximately three to four times the amount of salt used up through the tank in order to quickly and thoroughly regenerate the zeolite. Thus in the past if three and one-half pounds of salt provided the necessary exchangeable sodium ions to replace all the calcium and magnesium ions in an exhausted zeolite bed, twelve pounds of salt would actually have to be used to quickly and efficiently regenerate the zeolite. If five zeolite cylinders are arranged in series and if, for example, twelve pounds of salt is required to regenerate each softener individually, it is possible to regenerate the entire series with approximately thirty pounds of salt or six pounds per softener. This is true because the thirty pounds of salt passing through the first cylinder quickly and thoroughly regenerates the zeolite, and in each succeeding cylinder there is a preponderance or considerable excess of salt because the excess salt from each softener is sent to the next in line. Thus fifty percent of the brine previously required to regenerate the five cylinders may be saved.

When using six pounds of salt in multiple regeneration it is possible to obtain a capacity up to 24,000 grains for a one and one-half cubic foot softener. With the same quantity of salt in individual regeneration a maximum capacity of only 12,000 grains is to be expected.

It is a feature of my invention to provide a system wherein a series of zeolite cylinders may be treated at the same time, it being possible to backwash a series of cylinders, siphon out a series of cylinders, salt a series of cylinders, or rinse a series of cylinders simultaneously. With my system, it is also possible to accomplish the backwashing and salting of a number of cylinders simultaneously. Cylinders may also be backwashed and rinsed simultaneously, siphoned and salted simultaneously, or siphoned and rinsed simultaneously. Thus a number of operations may be accomplished by my apparatus simultaneously so that zeolite cylinders may be rejuvenated in the least possible time with the smallest amount of difficulty.

It is a feature of my invention that the cylinders forming the water softening units are almost completely filled with zeolite. In the past, it has been customary to provide a tank having a gravel bed or base, a bed of zeolite thereupon, and a free-board above the zeolite so that when the mineral was backwashed to clean the same, the zeolite bed would expand into the free-board and not flow out of the filter tank. Where portable tanks are used, however, it is necessary to make these tanks as small as possible so as to have a maximum softening capacity for a minimum of weight and to do so one must employ only the elements actually used for softening purposes. Thus a new method of backwashing is necessary with my new type of softener. In order to provide an opportunity for the zeolite to expand and be thoroughly washed, I provide a funnel or auxiliary tank secured to the outlet of the tank or cylinder during the backwashing process. When water is forced into the cylinder, the zeolite is permitted to expand into the backwashing funnel or auxiliary tank, and thus this material may be thoroughly washed.

It is a feature of my invention to provide a system of backwashing in which the zeolite is permitted to expand into a separate container during the washing process, and to provide a suction on the inlet of the cylinder to return the zeolite into the cylinder after the washing operation.

It is a further feature of my invention to provide a zeolite softener in the form of a cylinder almost entirely filled with the mineral which may be detachably secured in a water system and which may be readily exchanged for a fresh cylinder when the mineral therein approaches an exhausted condition.

It is an added feature of my invention that the zeolite cylinder is entirely free of nozzles, screens, or other means of retaining the zeolite within the cylinder during the backwashing process. In the past, it has been necessary to provide means of holding the zeolite contained in the cylinder during this process, thus making a greater water pressure necessary to force the washing water through the mineral and increasing the back pressure upon the water line. Under the present system the zeolite is free to travel from the cylinder into the funnel or auxiliary tank and the water is free to overflow from this funnel or auxiliary tank. Thus less pressure is required to thoroughly clean the mineral.

These and other objects and novel features of my invention will be more clearly and fully set forth in the following specification and claims.

In the drawings forming a part of my specification:

Figure 1:
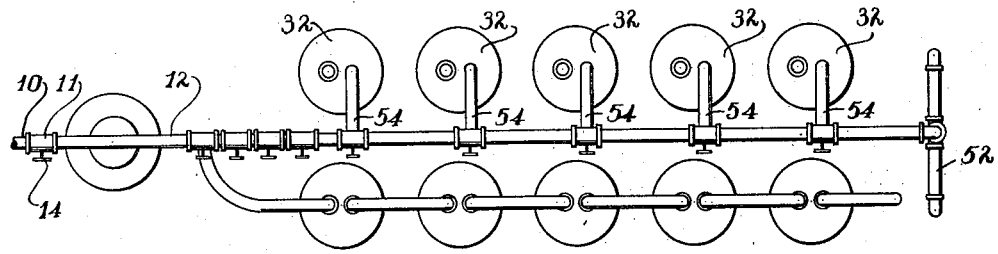
Figure 1 is a top plan view of an apparatus for salting and backwashing a series of zeolite cylinders simultaneously.
Figure 2:
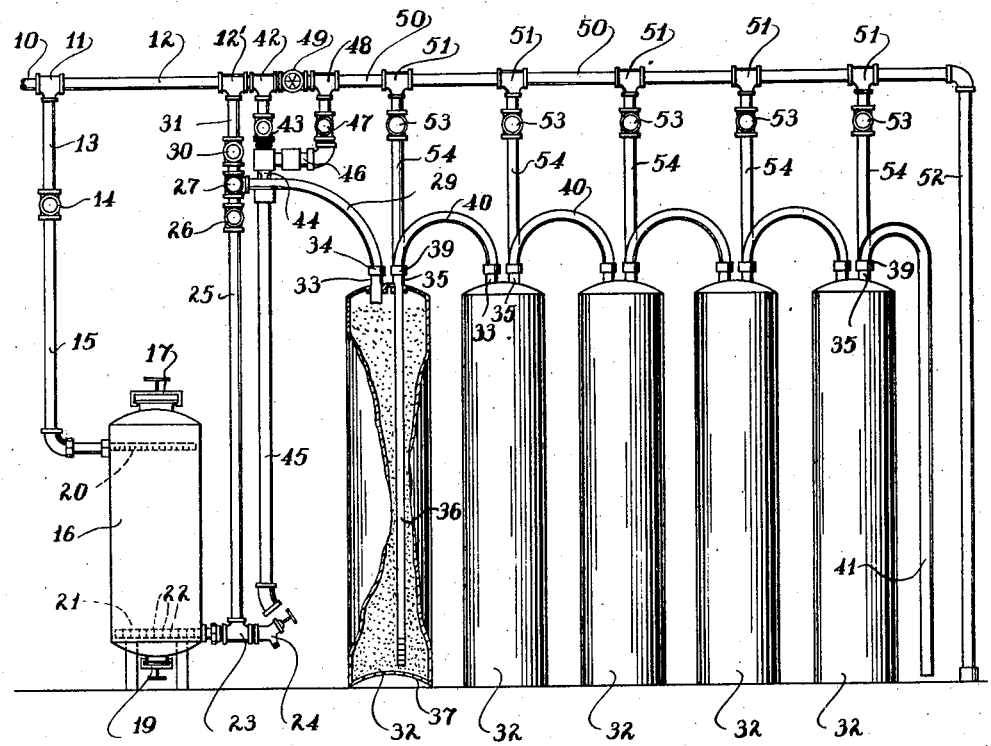
Figure 2 is a side elevational view of the system illustrated in Figure 1.

With reference to Figures 1 and 2 of the drawings, the water supply line 10 extends through the T 11 and is conducted to the pipe 12 and also to the vertically extending pipe 13. A valve 14 is provided in the pipe 13 and this valve 14 is connected by a pipe 15 to a salt pot 16.

The salt pot 16 comprises a tank of substantial size having a hand opening cover 17, and a second hand opening cover 19 is provided at the bottom of the tank for cleaning the same. A slotted brass inlet manifold 20 is secured to the pipe 15 and admits water into the tank in the form of a spray which thoroughly covers and dissolves the salt. The outlet manifold 21 is also provided with slots or perforations 22 and picks up the brine and conveys it to a T 23.

The T 23 acts to conduct brine or water from the tank 16 to a drain cock or valve 24 and also to a pipe 25. A valve 26 is provided in the pipe line 25 to cut off the brine supply to a T 27 from which extends a cylinder inlet pipe 29. The T 27 is also connected through the valve 30 and the pipe 31 to a T 32 attached to the pipe 12. It will be seen that by opening the valve 30 and closing the valve 26, fresh water may be forced through the T 27 and the cylinder inlet pipe 29, while if the valve 30 is closed and the valve 26 opened, brine may flow through the T 27 and the cylinder inlet pipe 29. Each of the zeolite tanks 32 are similarly constructed and include an inlet nipple or coupling 33 attached by a disconnectable coupling 34 to a suitable inlet pipe such as the pipe 29. The outlet fitting 35 is connected to a vertical pipe or tube 36 extending into close proximity with the base or bottom 37 of the cylinder 32. The fitting 35 is provided with a disconnectable joint 39 similar to the joint 34 which may be connected to an outlet pipe such as 40.

In arranging a plurality of tanks 32 in series, the first tank in line is connected by the joint or coupling 34 to the inlet filler pipe 29. The outlet fitting 35 is connected by its coupler 39 to a connecting pipe 40. This pipe 40 is in turn secured to the inlet fitting 33 of the next adjacent cylinder. Thus the outlet of the first cylinder is connected to the inlet of the second, and so on through the series. The outlet 35 of the last tank 32 of the series is secured by its coupling 39 to a drain or waste brine pipe 41 through which the remaining brine is conducted to a suitable sewer or waste tank.

Also secured adjacent the T 12' to receive water from the water supply pipes 10 and 12, I provide a T 42 connected by a valve 43 to an ejector 44 in a pipe line 45 leading to the drain. When water is forced through the valve 43 and the ejector 44, a suction is created in the pipe 46 connected by the valve 47 to a T 48. This T 48 is connected through the valve 49 to the T 42 and is also connected to a pipe line 50 having a series of spaced T's 51 throughout the length thereof. The end of the pipe line 50 terminates in a suitable supporting standard 52.

Each of the T's 51 is connected to a valve 53 through which water may be directed to a pipe or tube 54 to the cylinders 32 to be backwashed. During the backwashing operation, the pipe 54 is connected to the outlet coupling 39 of the tanks 32. The inlet coupling of these tanks is equipped with a backwashing funnel 55 of the type illustrated in Figures 4 and 5 of the drawings. These funnels 55 are connected to the coupling 34 and are provided with a drain 56 near the top of the same through which wash water may flow.

When it is desired to regenerate a series of zeolite cylinders 32 by passing brine through the same, the desired quantity of salt is placed within the salt pot 16 and the cylinders 32 are connected in series, the first cylinder of the series being connected to the cylinder inlet pipe 29, the individual cylinders being connected by the pipes 40 and the last cylinder of the series being connected to the drain pipe 41. Valves 14 and 26 are then turned on. The valve 14 permits water from the water supply pipe 10 to flow through the T 11, pipe 13, valve 14, pipe 15, and inlet manifold 20 to spray upon the salt within the tank 16. The brine formed in this way is directed through the outlet manifold 21, the pipe 25, the valve 26, T 27 and inlet pipe 29 into the first cylinder 32. From this cylinder, the brine flows into the next succeeding cylinder through the connector 40 and finally flows through the drain pipe 41 and is wasted.

After the salting process has been completed, the valves 26 and 14 are closed and the valve 30 is opened admitting clear water from the pipes 10 and 12, T 12', pipe 31, valve 30, T 27 and inlet pipe 29 to flow in a similar manner through the series of tanks 32, thus the zeolite within the tanks is thoroughly rinsed.

Backwashing of the cylinders should take place prior to the salting of the same. The frequency with which the softener should be backwashed depends upon the turbidity in the water. On many waters the cylinders should be backwashed before each salting. This will assure a clean mineral which will last longer and give improved results.

In backwashing the cylinders to clean the zeolite the pipes 54 are connected to the coupling 39 on the outlet fitting 35 of each cylinder 32. The funnel 55 should be connected to each inlet fitting 34 of each cylinder 32. Then by opening the valve 49, and closing valves 14, 43, and 47, water is permitted to flow through the pipe line 50. This water is conducted through the open valves 53 and the connecting pipes 54 into the outlet pipe 36 of each cylinder, passing through the zeolite in an upward direction. As the zeolite expands, it is carried by the water up into the funnel 55 so that the bed of zeolite is expanded considerably in volume and the particles are thoroughly washed. The water flows upwardly through the funnels 55 and is allowed to escape through the drains 56. After the backwashing operation is complete, the valve 49 is closed, cutting off the supply of liquid to the pipe line 50 and the connecting pipes 54. The valves 43 and 47 are then opened. The valve 43 permits a flow of water through the ejector 44 creating a suction in the pipe 46 which is in communication through the valve 47 with the pipe line 50. The water within the pipe line 50 and within the connecting pipes 54 is then moved in a reverse direction by the suction and drawn out of the cylinders 32, escaping through the drain pipe 45. The zeolite is drawn back into the various cylinders 32 and these cylinders are then clean and in condition for salting.

The manner in which the cylinders may be backwashed and siphoned out has been explained and the manner in which the cylinders may be salted and rinsed has also been described in detail. From an observation of Figures 1 and 2 of the drawings, it will become apparent that certain of these operations may take place simultaneously. By permitting a flow of water from the water supply pipe through the pipes 12 and 13 and valve 14 and by opening the valves 26 and 49 while the valves 30, 43, and 47 remain closed, the brine may be forced through a series of tanks 32 at the same time water is being forced through connecting pipes 54 to backwash a series of cylinders as long as the valves 53 remain open. Furthermore, it is obvious that with the same setting of valves, by closing valves 14 and 26 and opening valve 30, the series of tanks 32 may be rinsed simultaneously with the backwashing of the other series of cylinders 32. By opening valves 14, 26, 43, 47, and 53, leaving valves 30 and 49 closed, one series of cylinders 32 may be salted, while the other series of cylinders 32 is being siphoned. Furthermore, by opening valves 30, 43, 47, and 53, while closing valves 14, 26, and 49, one series of cylinders may be rinsed while the other series is being siphoned.

In order to properly salt a cylinder such as 32, it is necessary to force a preponderance of salt through the same. Thus if the sodium ions of three and one-half pounds of salt are to be used in regenerating the zeolite of one cylinder, and to displace the calcium, magnesium and other ions therefrom, it is ordinarily necessary to force approximately twelve pounds of salt through the zeolite in order to quickly and effectively regenerate the mineral. If a larger amount of salt is used, the regenerating process will be accomplished more quickly and thoroughly than if a lesser amount is used. Naturally, this excess of salt will cause a large waste of salt with every regeneration. Therefore, by arranging the cylinders in series, a minimum of salt is wasted, while at the same time the mineral is very quickly regenerated because of the great preponderance in most of the cylinders.

If five cylinders are to be rejuvenated in series and if twelve pounds of salt is required to rejuvenate each cylinder individually, for example, it is possible for me to regenerate the entire series of cylinders very quickly with a total of about thirty pounds of salt instead of sixty pounds of salt, required for regenerating five softeners individually. In the first cylinder into which the brine is forced, the great preponderance of brine will quickly change the zeolite to its desired form. A certain amount of the brine is changed chemically by the calcium and magnesium and other impurities in the zeolite, and these compounds in the form of calcium chloride, magnesium chloride, and the like pass off in the waste brine. There is still, however, a great preponderance of brine in the second cylinder, thus effecting quick regeneration of the second cylinder. Each succeeding cylinder is treated with relatively less brine and relatively more of the calcium chloride and magnesium chloride solutions. However, there is still a sufficiently great preponderance of brine in the last cylinder of the series to regenerate the zeolite as quickly and as thoroughly as would be the case if twelve pounds of brine were used for the regeneration of this single cylinder. Thus by providing an excess of only two and one-half pounds of salt for each cylinder, the regeneration operation is as quickly and thoroughly effected as when eight and one-half pounds of excess salt were used when one unit was regenerated alone. In other words the first cylinder of the series is regenerated as thoroughly and as effectively as though thirty pounds of salt were forced through this tank alone. The final cylinder of the series will be regenerated as thoroughly as though twelve pounds of salt were passed through the same and wasted. In actual fact, however, only twelve pounds of salt have been wasted for the entire series, whereas forty-two pounds would have been wasted had each one been regenerated individually.

Figures 3, 4, 5:
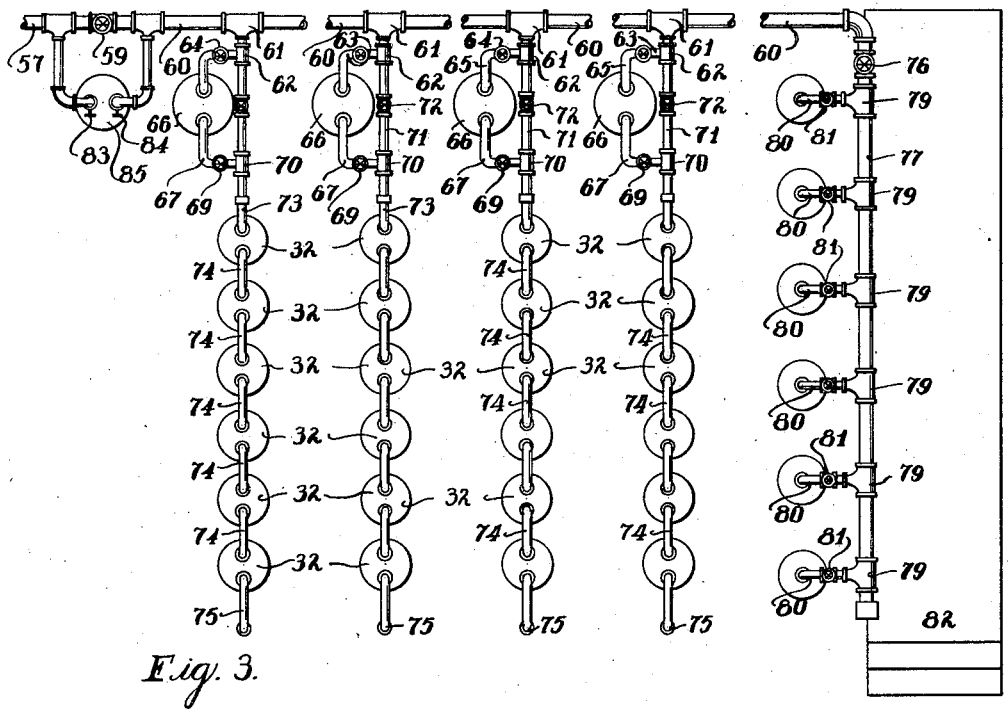
Figure 3 is a top plan view illustrating diagrammatically a system for salting and backwashing a series of cylinders, the system being of a slightly modified form.
Figure 4 is a diagrammatic view illustrating a cylinder arranged for a backwashing operation.
Figure 5 illustrates the manner in which the zeolite may be returned to the cylinder from the backwashing funnel.

From the foregoing discussion, the advantage of the present system of regeneration is believed to be obvious. One type of apparatus which may be used to accomplish my method has been described. In Figure 3 of the drawings I disclose a modified form of apparatus which will also accomplish the desired results. In this alternative form of system, the supply pipe 57 is connected through the valve 59 to the pipe line 60, from which line branch a series of T's 61. Each of the T's 61 is connected to a T 62 which is connected by the pipe 63 through valve 64 to the inlet manifold 65 of the salt pot 66. The outlet manifold 67 is connected through a valve 69 to a T 70. A bypass pipe 71 leading through a valve 72 connects the T's 62 and 70. Thus water may be forced through the individual salt pots 66, or directly into the connecting pipe 73 which is similar to the cylinder inlet pipe 29 previously described. The outlet of each of the cylinders 32 is connected to the inlet of the next adjacent cylinder 32 by means of a connector 74. The connector 74 is similar to the previously described connector 40. The last cylinder of each series is connected to a drain pipe 75, identical with the previously described drain pipe 41. The pipe 60 also leads through the valve 76 to a pipe line 77 containing a series of T's 79. Each of the T's 79 directs liquid to the pipe line 80 including a valve 81. The pipe lines 80 lead to the outlet coupling 39 of cylinders 32 for backwashing purposes. A platform 82 is provided adjacent the pipe line 77 for convenience in coupling the various cylinders 32.

In the operation of the alternative system illustrated in Figure 3, water from the inlet pipe 57 may be conducted through valve 59, T's 61 and 62, valves 64 and 69, through the salt pot 66, through the T 70, and the inlet pipe 73 to the series of cylinders 32. These cylinders are connected in series by the connecting pipe 74 and the last cylinder of the series is provided with a drain pipe 75 through which the waste brine may be directed. After the salting operation the cylinders may be rinsed by closing the valves 64 and 69 and opening the valve 72. If, however, it is desired to use soft water for the rinsing of the cylinders, the valve 59 may be closed and the valves 83 and 84 may be opened, directing water through the softener 85 on its way to the pipe line 60.

To backwash the cylinders, the outlet couplings 39 of the cylinders 32 are connected to the connecting pipes 80 and funnels 55 are connected with the inlet couplings 34. The valves 76 and 81 are open, permitting water to flow through the various cylinders 32 to backwash the cylinders.

In the system illustrated in Figure 3, I disclose no suction pump to return the zeolite to the respective cylinders. Such a suction may of course be provided in this system, but for the purpose of illustration I have described in Figure 5 of the drawings a siphon pipe 86 connected with the outlet coupling 39 of each of the cylinders being backwashed. This siphon pipe 86 acts to siphon all of the water out of the cylinder, creating a vacuum within the cylinder to draw the zeolite back from the funnel 55 when connected as illustrated in Figure 5.

In accordance with the patent statutes, I have described the principles of construction and operation of my apparatus and method for the multiple regeneration of zeolite cylinders; and while I have endeavored to set forth the best embodiments thereof, I desire to have it understood that these are only illustrative of a means of carrying out my invention, and that obvious changes may be made within the scope of the following claims without departing from the spirit of my invention.

I claim:

1. A system for regenerating portable zeolite tanks with brine consisting in connecting a series of portable zeolite tanks in series with the outlet of one portable tank connected to the inlet of the next adjacent portable tank in the series, and forcing through said portable tanks an amount of brine capable of regenerating the total number of portable tanks with a slight excess for the last portable tank of the series.

2. A system for regenerating portable zeolite tanks each having inlet and outlet passageways, with brine formed by mixing a predetermined amount of salt and water in a fixed brine tank, the method consisting in connecting the portable tanks in series with the outlet of one portable tank connected to the inlet of the next adjacent portable tank; and connecting the fixed brine tank to the first portable tank of the series; the brine in said tank being in just sufficient quantity in regenerate zeolite in all but the last portable tank of the series; and being substantially twice the necessary quantity for said last portable tank; and forcing said brine through said series of portable tanks.

3. An apparatus for the multiple regeneration of portable zeolite tanks comprising a series of portable zeolite tanks each having a similarly positioned inlet and a similarly positioned outlet, means connecting the outlet of the first portable tank of the series to the inlet of the second portable tank; means connecting the outlet of each successive portable tank to the inlet of the next following tank, a fixed brine tank having an outlet, means connecting the inlet of the first portable tank to said brine tank outlet, and means forcing brine from said brine tank through said series of portable tanks.

4. The process of backwashing a tank having an inlet, an outlet, and a connected washing container, said tank being almost filled with zeolite, the process consisting in forcing water into the zeolite, expanding the zeolite and forcing the same into the washing container above the level of said tank, washing the zeolite with water, and applying a suction to draw the zeolite back into said tank.

5. The method of backwashing zeolite in a container having a water inlet and a water outlet and having a washing chamber secured to the inlet thereof, the method consisting in forcing water into the outlet of said container, expanding the zeolite and forcing a part of the same into said washing chamber, running water through said container and chamber to wash the same, and applying suction to said outlet to draw said zeolite back into the container.

6. The method of backwashing zeolite in a cylinder having an inlet and an outlet, and having a chamber secured into said inlet, the method consisting in forcing water through the outlet, expanding the zeolite and forcing some of the same up into said chamber, causing water to flow through said cylinder and into said chamber to wash the zeolite, then causing the zeolite in said chamber to flow back into said cylinder.

7. A multiple regeneration system for zeolite water softener cylinders comprising a water supply pipe, an inlet from said supply, a plurality of substantially identical cylinders containing zeolite, similarly positioned inlets and outlets therein, means connecting said cylinders in series, with the outlet of each cylinder connected to the inlet of the next cylinder, a by-pass in said supply inlet, a salt-pot in said by-pass, and valve means selectively directing water through said salt-pot to said cylinders, and valve means adapted to direct water to said cylinders when said first valve means is closed.

8. A multiple regeneration system for zeolite water softener cylinders comprising a drain, a water supply pipe, a by-pass attached to said supply pipe, a salt-pot in said by-pass, inlet and outlet manifolds in said salt-pot in said by-pass, a series of substantially identical tanks containing zeolite, each tank having similarly positioned inlets and similarly positioned outlets, means connecting said tanks in series, with the outlet of each tank connected to the inlet of the next tank, and the outlet of the last tank of the series directed to the drain, and valve means connecting said supply pipe to the first of said series of tanks, and valve means selectively directing water from said supply pipe to said cylinders and valve means directing salt water from said by-pass to said tanks.

9. A multiple regeneration apparatus for zeolite water softeners comprising a water supply pipe, a by-pass in said supply pipe, a water softener in said by-pass means selectively directing a flow of water directly through said supply pipe or through said water softener; a salt-pot connected to said supply pipe, a plurality of tanks to be regenerated, means connecting said tanks in series, means connecting said salt-pot to the first tank of said series, a by-pass around said salt-pot from said supply pipe to said last named connecting means, and valve means selectively directing water either through said salt-pot to said tanks, or directing fresh water through said by-pass to said tanks around said salt-pot.

10. An apparatus for multiple backwashing tanks containing zeolite comprising a supply pipe line, a series of outlet pipes connected thereto, an inlet and an outlet on the tanks, means connecting said outlet to said outlet pipes, and an auxiliary container secured to said inlet to receive zeolite forced from said tank, and means for passing water through and out of said auxiliary container.

11. An apparatus for multiple backwashing tanks containing zeolite comprising a water supply line, a series of outlet pipes secured thereto, a drain pipe secured to said water supply line between the water supply and said series of outlet pipes, an ejector in said drain pipe creating a partial vacuum, a pipe connecting said drain pipe at the area of partial vacuum to said supply line toward said outlet pipes from said first named drain pipe connection, valve means to selectively direct water past said drain pipe to said outlet pipes, and valve means to direct water through said drain pipe to create a partial vacuum in said outlet pipes, and tanks containing zeolite secured to said outlet pipes when said first valve means is closed.

12. An apparatus for treating cylinders containing zeolite consisting in a water supply line, a salt-pot in said supply line, a by-pass around said salt-pot, a plurality of tanks connected in series, a connector from said by-pass and said salt-pot to the first tank of said series; a pipe line connected to said supply line, a drain pipe connected to said pipe line, an ejector in said drain pipe including a chamber containing a partial vacuum when water is directed through said drain pipe, means connecting said chamber to said pipe line beyond said drain pipe with respect to said supply line, valve means selectively directing water through said pipe line and valve means directing water through said drain pipe, to create either water pressure or partial vacuum in said pipe line beyond said drain pipe when said first valve means is closed, and a series of outlet pipes communicating with said pipe line beyond said drain pipe.

EMMETT JOSEPH CULLIGAN.

CERTIFICATE OF CORRECTION.

Patent No. 2,252,065. August 12, 1941.

EMMETT JOSEPH CULLIGAN.

It is hereby certified that error appears in the printed specification of the above numbered patent requiring correction as follows: Page 4, second column, line 63, claim 2, for "baing" read --being--; line 64, same claim, for "quantity in" read --quantity to--; and that the said Letters Patent should be read with this correction therein that the same may conform to the record of the case in the Patent Office.

Signed and sealed this 16th day of September, A. D. 1941.

(Seal)

Henry Van Arsdale,
Acting Commissioner of Patents.